United States Patent
Banthia et al.

(10) Patent No.: US 9,554,331 B2
(45) Date of Patent: Jan. 24, 2017

(54) TECHNIQUES FOR ACTIVATING SINGLE WIRE COMMUNICATIONS

(71) Applicant: QUALCOMM Incorporated, San Diego, CA (US)

(72) Inventors: Ashish Banthia, San Diego, CA (US); Alberto Salcedo, Chula Vista, CA (US); Alan Gillespie, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 14/627,855

(22) Filed: Feb. 20, 2015

(65) Prior Publication Data

US 2016/0088560 A1 Mar. 24, 2016

Related U.S. Application Data

(60) Provisional application No. 62/052,159, filed on Sep. 18, 2014.

(51) Int. Cl.

| | |
|---|---|
| *H04W 4/00* | (2009.01) |
| *H04W 52/02* | (2009.01) |
| *H04B 5/00* | (2006.01) |
| *H04W 56/00* | (2009.01) |
| *G06K 7/10* | (2006.01) |

(52) U.S. Cl.
CPC ...... *H04W 52/0229* (2013.01); *G06K 7/10247* (2013.01); *H04B 5/0037* (2013.01); *H04W 4/008* (2013.01); *H04W 56/001* (2013.01)

(58) Field of Classification Search
CPC ............. H04W 52/0229; H04W 4/008; H04W 56/001; G06K 7/10247; H04B 5/0037
See application file for complete search history.

(56) References Cited

U.S. PATENT DOCUMENTS

| | | | |
|---|---|---|---|
| 8,342,415 B2 | 1/2013 | Soh et al. | |
| 8,843,065 B2 | 9/2014 | Degauque et al. | |
| 2008/0313487 A1* | 12/2008 | Mochizuki | G06F 1/04 713/601 |
| 2010/0330904 A1 | 12/2010 | Stougaard | |
| 2012/0108169 A1* | 5/2012 | Degauque | G06K 7/10247 455/41.1 |
| 2013/0143489 A1 | 6/2013 | Morris et al. | |
| 2013/0225074 A1* | 8/2013 | Charles | H04B 5/0037 455/41.1 |
| 2014/0036723 A1* | 2/2014 | Rizzo; Pierre | G06K 7/0008 370/254 |
| 2014/0154979 A1 | 6/2014 | Tomas et al. | |
| 2016/0020801 A1* | 1/2016 | Dos Santos | H04B 1/3816 455/558 |
| 2016/0112159 A1* | 4/2016 | Banthia | G06Q 20/327 714/748 |

OTHER PUBLICATIONS

International Search Report and Written Opinion—PCT/US2015/045028—ISA/EPO—Nov. 18, 2015. (10 pages).

* cited by examiner

*Primary Examiner* — Clemence Han
(74) *Attorney, Agent, or Firm* — Arent Fox LLP

(57) ABSTRACT

Aspects disclosed herein relate to activating a single wire protocol (SWP) interface with a circuit card. A single wire protocol (SWP) activation procedure is initiated with a circuit card. During the SWP activation procedure, an unexpected frame may be received, and a different SWP activation procedure may be initiated with the circuit card based at least in part on receiving the unexpected frame during the SWP activation procedure.

24 Claims, 4 Drawing Sheets

TECHNIQUES FOR ACTIVATING SINGLE WIRE COMMUNICATIONS

CLAIM OF PRIORITY UNDER 35 U.S.C. §119

The present application for patent claims priority to Provisional Application No. 62/052,159 entitled "TECHNIQUES FOR ACTIVATING SINGLE WIRE COMMUNICATIONS" filed Sep. 18, 2014, which is assigned to the assignee hereof and hereby expressly incorporated by reference herein.

BACKGROUND

Aspects described herein generally relate to activating single wire protocol (SWP) communications within a wireless device and specifically to improving activation of the SWP communications.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, near-field communications (NFC), etc.

NFC can be used for secured communications in a device equipped with a universal integrated circuit card (UICC) where the device may activate a contactless frontend (CLF) that connects to the UICC to provide the secured communications. SWP is used as the interface between the CLF and UICC in a device such that the CLF activates a pin of the UICC as the single wire input/output (SWIO) to provide an energy (e.g., voltage) thereto, along with a transmission clock, and/or other signals for bus management. Data to be transmitted to/from the UICC using SWP is represented by binary states of voltage and current on the single wire.

Activation procedures for SWP between the CLF and UICC in a device involve various frames transmitted between the CLF and UICC. It is possible, however, that one or more frames of the activation procedure are not properly sent or received between the CLF and UICC.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

Various aspects are described in connection with handling of unexpected communications in single wire protocol (SWP) activation. For example, where a frame expected from a universal integrated circuit card (UICC) is not properly received at a contactless frontend (CLF) during an activation procedure, the CLF may request resending of the frame from the UICC. Where the resent frame is of a different type than that expected from the UICC as part of the activation procedure, the CLF can reinitiate SWP activation with the UICC using a different activation procedure that supports receiving the different type of frame from the UICC. Thus, the CLF can properly activate SWP with the UICC by using the different activation procedure.

In an example, a method for activating a single wire protocol (SWP) interface with a circuit card is provided. The method includes initiating a SWP activation procedure with a circuit card, detecting that an unexpected frame is received during the SWP activation procedure, and initiating a different SWP activation procedure with the circuit card based at least in part on receiving the unexpected frame during the SWP activation procedure.

In another example, an apparatus for activating a SWP interface with a circuit card is provided. The apparatus includes a SWP activating component configured to initiate a SWP activation procedure with a circuit card, a frame detecting component configured to detect that an unexpected frame is received during the SWP activation procedure, and a different SWP activation procedure component configured to initiate a different SWP activation procedure with the circuit card based at least in part on receiving the unexpected frame during the SWP activation procedure.

In yet another example, an apparatus for activating a SWP interface with a circuit card is provided. The apparatus includes means for initiating a SWP activation procedure with a circuit card, means for detecting that an unexpected frame is received during the SWP activation procedure, means for initiating a different SWP activation procedure with the circuit card based at least in part on receiving the unexpected frame during the SWP activation procedure.

In another example, a computer-readable medium storing computer executable code for activating a SWP interface with a circuit card is provided. The computer-readable medium includes code for initiating a single wire protocol (SWP) activation procedure with a circuit card, code for detecting that an unexpected frame is received during the SWP activation procedure, and code for initiating a different SWP activation procedure with the circuit card based at least in part on receiving the unexpected frame during the SWP activation procedure.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Generally, a near field communication (NFC) device performs a single wire protocol (SWP) activation procedure between a contactless frontend (CLF) and a universal integrated circuit card (UICC) that includes a series of frames communicated therebetween. According to the present aspects, when a frame is not properly received or not received as expected in the activation procedure, a different activation procedure may be performed, which may be based on a type of frame received where the received frame is not as expected in the original activation procedure. For example, when sending a message indicating resending of a frame, a certain type of frame may be expected in response in the activation procedure (e.g., an activation ready frame). If a different type of frame (e.g., an activation synchronization frame) is received, however, a different activation procedure can be used to activate SWP, where the different activation procedure expects to receive the different type of frame in response to the message indicating resending of the frame. Thus, in either case, the CLF can properly activate SWP with the UICC by using the different activation procedure.

Figure 1:
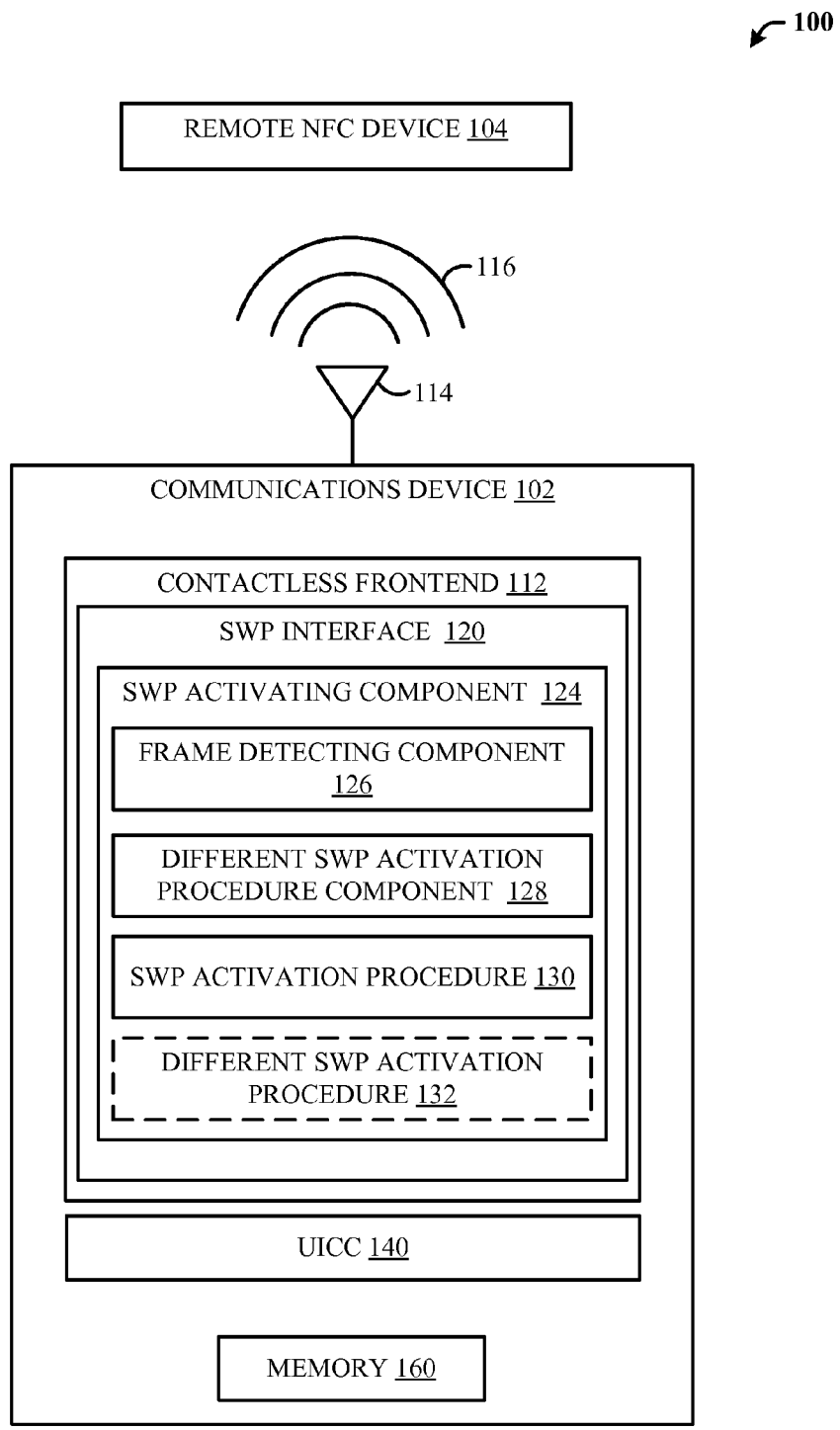
FIG. 1 is a block diagram of a NFC environment, according to an aspect.
Figure 2:
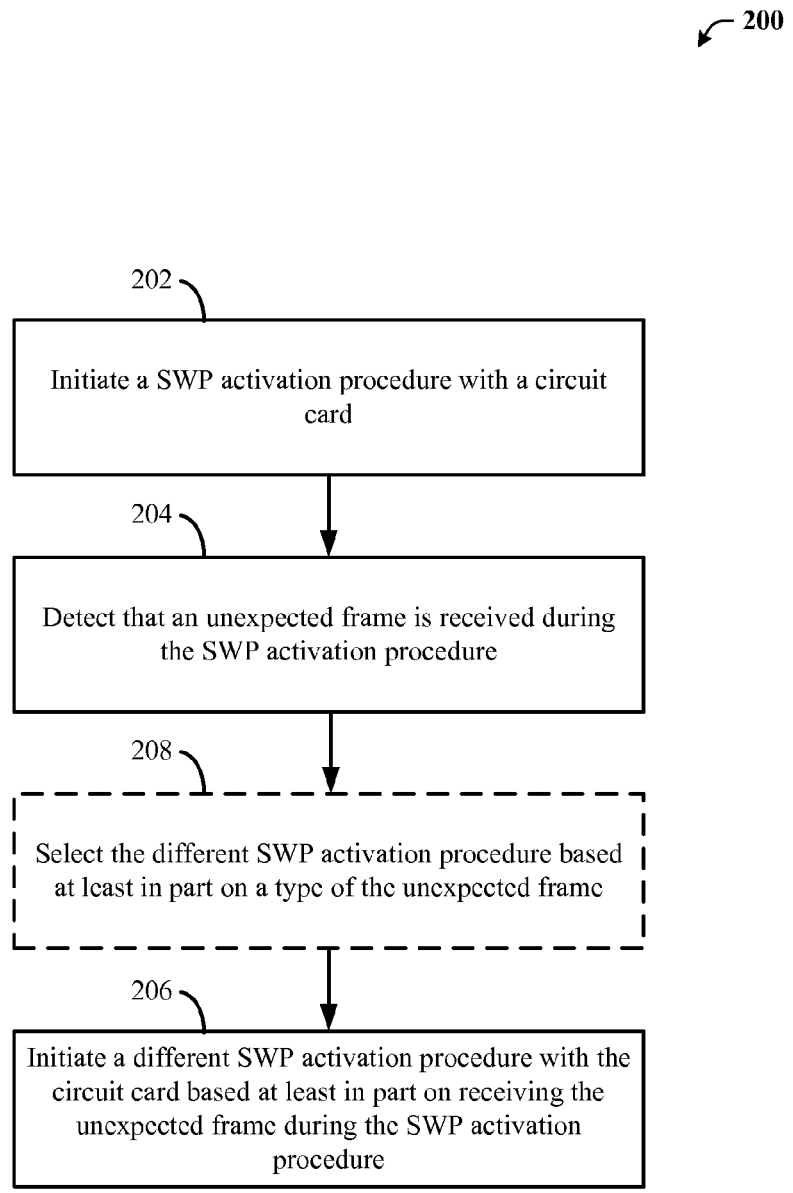
FIG. 2 is a flowchart describing an example of activating a single wire protocol (SWP), according to an aspect.
Figure 3:
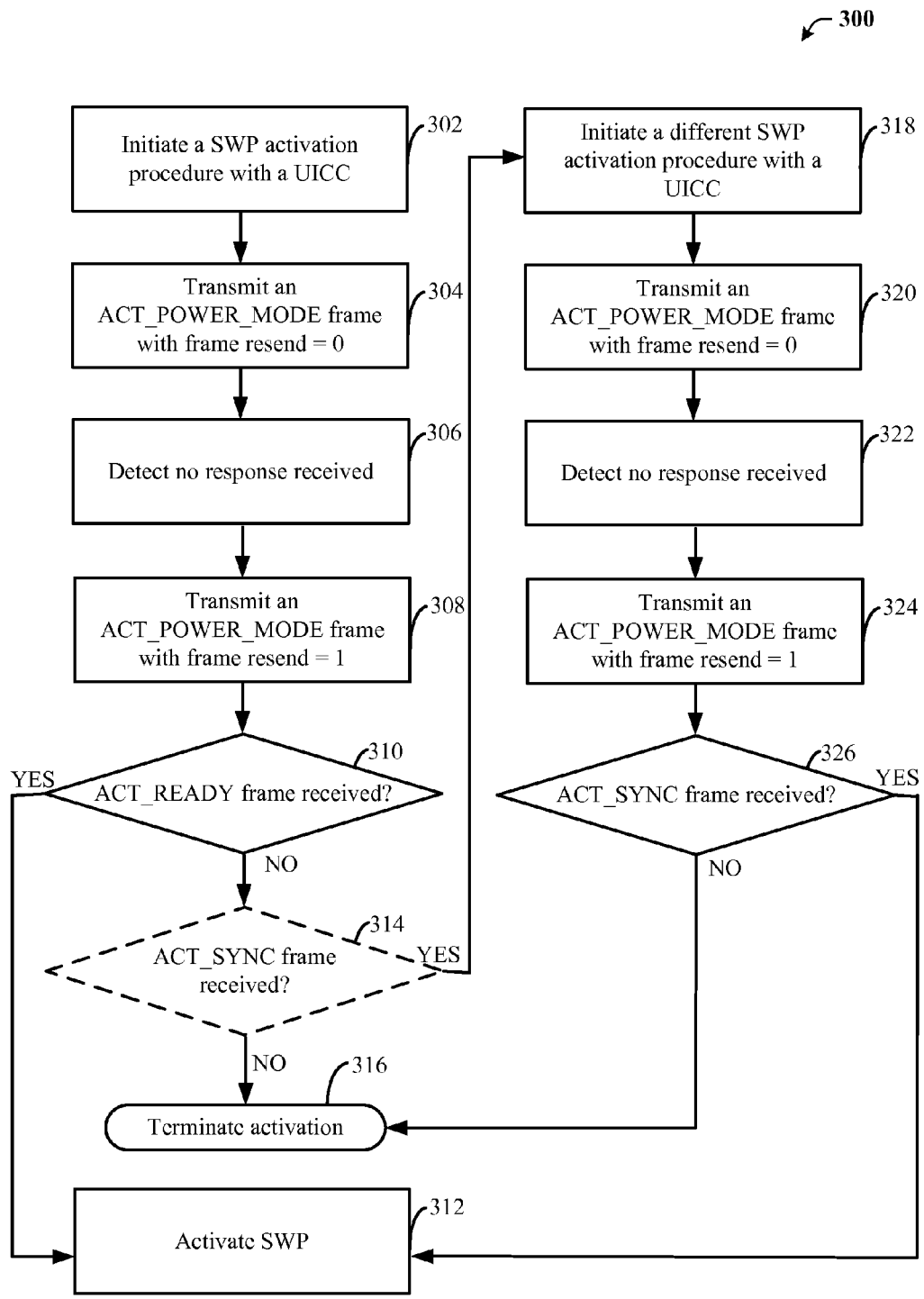
FIG. 3 is a flowchart describing another more specific example of activating a SWP, according to an aspect.

Referring to FIGS. 1-3, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 2 and 3 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 1 illustrates a block diagram of a communication network 100 according to aspects described herein. Communication network 100 may include a communications device 102 which, through antenna 114, may communicate with one or more remote NFC devices, such as remote NFC device 104. It is to be appreciated that each communications device 102, remote NFC device 104, etc. in the communication network 100 may use one or more NFC radio frequency (RF) technologies 116 (e.g., NFC-A, NFC-B, NFC-F, etc.) to provide a communications field that facilitates communications between communications device 102 and remote NFC device 104 within range to perform communications (e.g., communications device 102 is within range of a communication field from remote NFC device 104 and/or vice versa).

To facilitate communicating with remote NFC device 104, communications device 102 may include a CLF 112, which may include or may be employed by an NFC controller of the communications device 102, and can use antenna 114 to communicate with remote NFC device 104 over the one or more NFC RF technologies 116. In this regard, the CLF 112 can facilitate discovery of one or more NFC devices, such as remote NFC device 104, using the NFC technology and/or management of communications therewith. The CLF 112 can also initiate SWP with a UICC 140 of the communications device via SWP interface 120. This allows the UICC 140 to operate the CLF 112 over the SWP interface 120 to communicate with remote NFC devices, such as remote NFC device 104. It is to be appreciated that UICC 140 can include substantially any circuit card, such as a subscriber identity module (SIM) card, that may also facilitate operating communications device 102 on a wireless network (e.g., Universal Mobile Telecommunication System (UMTS), Long Term Evolution (LTE), or other 3GPP technology network). UICC 140 can provide identification and/or subscription information for a user for operating communications device 102. In this regard, for example, UICC 140 can become a secured element (SE) that communicates with the remote NFC device 104 via CLF 112 and antenna 114.

To facilitate establishing the SWP interface 120 between CLF 112 and UICC 140, SWP activating component 124 initiates an SWP activation procedure 130 by which multiple frames are communicated between the CLF 112 and UICC 140. As described further herein, where a frame in the SWP activation procedure 130 is not received as expected, SWP activating component 124 can reinitiate activation between the CLF 112 and UICC 140 using a different SWP activation procedure 132 in an attempt to properly handle the unexpectedly received frame. Thus, in an example, SWP activating component 124 can determine to reinitiate activation based at least in part on receiving an unexpected frame. For example, the SWP activation procedure 130 can be defined by the multiple frames communicated between the CLF 112 and UICC 140. As shown below in an example described in relation to FIG. 3, certain frames may be expected at certain steps in the SWP activation procedure 130, and receiving a frame that is not the expected frame (also referred to herein as an unexpected frame or unexpectedly received frame) may cause termination of the SWP activation procedure 130. In aspects described herein, however, an unexpectedly received frame may indicate a type of frame that the CLF 112 should expect to receive, and may thus be used to identify a different SWP activation procedure 132 that SWP activating component 124 can use to activate SWP (e.g., a different SWP activation procedure for which receiving the unexpectedly received frame is expected). SWP activating component 124 may accordingly select the different SWP activation procedure 132 to instead receive the unexpectedly received frame in the next activation attempt.

Communications device 102 may include further include memory 160 that may be configured to store one or more parameters related to performing SWP activation procedures 130 and/or 132 and/or other operations related to SWP. In an aspect, though not shown, UICC 140 may comprise memory 160 and/or a separate memory that includes instructions and/or parameters related to performing SWP activation and/or communications.

FIG. 2 illustrates an example method 200 for activating SWP with a circuit card. Method 200 includes, at Block 202, initiating a SWP activation procedure with a circuit card. SWP activating component 124 (FIG. 1) can initiate the SWP activation procedure 130 with the circuit card. The circuit card can be a UICC (e.g., UICC 140), or other SIM or similar card. For example, SWP activating component 124 can initiate the SWP activation procedure 130 based at least in part on a command from communications device 102, CLF 112, etc., which may be based on detecting remote NFC device 104, a command from an application executing on communications device 102, etc. The SWP activation procedure 130 may include communicating frames between CLF 112 and UICC 140 to activate the UICC 140 (e.g., via a voltage signal), activate a single wire input/output (SWIO), resume SWP, send a transition sequence, send a synchronization frame, specify a power mode (e.g., full power, or one or more lower powers, etc.), indicate activation is ready, etc. The frames expected at one or more steps in the SWP activation procedure 130 may be specific to or otherwise defined by the SWP activation procedure 130. Once activated, a contactless tunneling (CLT) frame can be sent.

Method 200 also includes, at Block 204, detecting that an unexpected frame is received during the SWP activation procedure. SWP activating component 124 can include a frame detecting component 126 that can detect that the unexpected frame is received during the SWP activation procedure 130. For example, as described further herein, the unexpected frame may relate to a frame sent in response for a request to resend a previous frame. For example, SWP activating component 124 can expect to receive a frame of a certain type based on frames that define the SWP activation procedure 130. Upon receiving a frame, SWP activating component 124 can determine a type of the frame (e.g., based on data indicated by the received frame), and if the type does not match a type expected by the SWP activation procedure 130, SWP activating component 124 can detect the frame as an unexpected frame.

Method 200 further includes, at Block 206, initiating a different SWP activation procedure with the circuit card based at least in part on receiving the unexpected frame during the SWP activation procedure. SWP activating component 124 may include a different SWP activation procedure component 128 for determining and/or initiating the different SWP activation procedure 132 based at least in part on receiving the unexpected frame. For example, the different SWP activation procedure 132 can be an activation procedure that expects to receive the unexpected frame received by SWP activating component 124 (e.g., at Block 204).

In one example, method 200 may also optionally include, at Block 208, selecting the different SWP activation procedure based at least in part on a type of the unexpected frame. Different SWP activation procedure component 128 can select the different SWP activation procedure 132 based at least in part on the type of the unexpected frame. For instance, different SWP activation procedure component 128 may determine a type of the different SWP activation procedure 132 to perform based at least in part on one or more parameters of the unexpected frame (e.g., a type of the frame, and/or the like). For example, different SWP activation procedure component 128 may store a type of activation procedure that expects to receive frames of the type of the unexpected frame at a certain point in the activation procedure, and may accordingly determine the type of different SWP activation procedure 132 to perform based on the type of the unexpected frame.

In a specific example, SWP activating component 124 initiates an SWP activation procedure at Block 202. When the SWP activating component 124 sends a frame specifying a power mode as part of the SWP activation procedure 130, the CLF 112 may not receive a response from UICC 140, or may receive a corrupted or otherwise invalid response. In this example, SWP activating component 124 can send another frame specifying the power mode and a request to resend the previous frame (e.g., since the CLF 112 did not receive the previous frame from UICC 140). In response to this frame, the UICC 140 may send the synchronization frame, as this was the last frame sent by the UICC 140, but the SWP activating component 124 may have been expecting a frame indicating activation is ready as a next frame in the SWP activation procedure 130. In this example, frame detecting component 126 detects the unexpected frame as the synchronization frame at Block 204. Accordingly, different SWP activation procedure component 128 can initiate a different SWP activation procedure 132 in an attempt to activate SWP with the UICC 140 based on receiving the unexpected frame (e.g., the synchronization frame). For example, different SWP activation procedure component 128 may determine to initiate a type of different SWP activation procedure 132 that expects a synchronization message in response to the activation ready frame, as described above.

FIG. 3 illustrates a specific example method 300 for detecting receipt of an unexpected frame in SWP activation and initiating a different SWP activation procedure based on a type of the unexpected frame, in accordance with aspects described in relation to FIGS. 1 and 2 above. Method 300 includes, at Block 302, initiating a SWP activation procedure with a UICC. As described, SWP activating component 124 can initiate the SWP activation procedure 130 with UICC 140 in response to detecting another NFC device or in response to an application executing on communications device 102. For instance, the SWP activation procedure 130 can correspond to a procedure defined in certain standards, such as European Telecommunications Standards Institute (ETSI) 102694 (e.g., version 9.4.0) as shown below, and may occur based on the communications device 102 receiving an indication from an operating system or other high layer application to initiate SWP, receiving a signal from a NFC remote device to initiate SWP for secure communications therewith, etc.

| Step | Direction | Description |
| --- | --- | --- |
| 1 | User -> T | Trigger the terminal to activate $V_{cc}$, SWIO and to perform further communication over simplified high level data link control (SHDLC) or CLT (e.g., by initiating a contactless card emulation session) |
| 2 | T -> UICC | Activate $V_{cc}$ (e.g., on contact C1) |
| 3 | T -> UICC | Activate SWIO (e.g., on contact C6) |
| 4 | UICC -> T | Resume SWP |
| 5 | T -> UICC | Send transition sequence |
| 6 | UICC -> T | Send activate synchronization (ACT_SYNC) frame |
| 7 | T -> UICC | Send an activate power mode (ACT_POWER_MODE) frame indicating full power mode with FR = 0 |
| 8 | UICC | No frame |
| 9 | T -> UICC | Send an ACT_POWER_MODE frame indicating full power mode with FR = 1 |
| 10 | UICC -> T | Send ACT_READY frame |
| 11 | T -> UICC | Send reset (RSET) frame or send CLT frame | where T can indicate terminal, which can include CLF 112 in this example, $V_{cc}$ is a voltage signal that CLF 112 can send to the UICC 140 on one or more contacts thereof (e.g., contact C0 to power the UICC 140, and SWIO is the I/O interface for SWP that can be initiated on another contact of UICC 140 (e.g., contact C6) where voltage bias over the contact is used to communicate according to the SWP.

Method 300 also includes, at Block 304, transmitting an ACT_POWER_MODE frame with frame resend (FR)=0. For example, SWP activating component 124 can transmit the ACT_POWER_MODE frame with FR=0 to UICC 140 using the SWP interface 120 (e.g., over contact C6 or otherwise), which can correspond to step 7 above.

Thus, method 300 also includes, at Block 306, detecting that no response is received to the ACT_POWER_MODE frame, and, at Block 308, transmitting another ACT_POWER_MODE frame with FR=1. SWP activating component 124 can detect that no response is received to the ACT_POWER_MODE frame, which can correspond to step 8 above, and can transmit the ACT_POWER_MODE frame with FR=1, which can correspond to step 9 above. For example, this can include detecting that no response is received after a period of time from transmitting the initiate ACT_POWER_MODE frame with FR=0, where the period of time can be configured by or for the communications device 102. In addition, detecting that no response is received to the ACT_POWER_MODE frame, at Block 306, can include detecting that a corrupted or otherwise invalid response is received. For example, SWP activating component 124 can determine a corrupted response based at least in part on determining that the response fails a cyclic redundancy or other verification.

Method 300 includes, at Block 310, determining whether an ACT_READY frame is received. Frame detecting component 126 can determine whether the ACT_READY frame is received (e.g., as expected in step 10 above). This may include, for example, decoding the frame and determining whether one or more parameters thereof are indicative of an ACT_READY frame, determining whether a signal pattern indicative of an ACT_READY frame is received, and/or other mechanisms for detecting whether an expected frame or related signal is received, etc. If the ACT_READY frame is received, as expected in the SWP activation procedure in ETSI 102694 for example, then method 300 includes, at Block 312, activating SWP. For example, SWP activating component 124 can activate SWP, which may include, for example, sending a CLT frame, as in step 11 above.

If, however, frame detecting component 126 determines that an ACT_READY frame is not received at Block 310, then method 300 may include, at Block 314, determining whether an ACT_SYNC frame is received. In this example, frame detecting component 126 can determine whether the ACT_SYNC frame is received. It is to be appreciated that transmitting the ACT_POWER_MODE frame at Block 308 and determining whether an ACT_READY frame is received at 310 may be performed multiple times before proceeding to Block 314 and/or 316, in one example. In a specific example, according to ETSI 102613 (e.g., version 11.0.0), when the CLF has received a corrupted frame or no frame the CLF can request the UICC to repeat the last ACT_SYNC frame by sending an ACT_POWER_MODE frame with FR bit set to 1 indicating the current terminal power mode. Thus, if the ACT_SYNC frame is received at Block 314, this may indicate that the UICC is expecting the SWP activation procedure to correspond to ETSI 102613 and not ETSI 102694. Thus, rather than failing SWP activation altogether, the CLF 112 can initiate a different SWP activation procedure 132 (e.g., via different SWP activation procedure component 128) to attempt another SWP activation procedure with the UICC 140.

If frame detecting component 126 detects that an ACT_SYNC frame is not received (e.g., or that the activation otherwise fails) at Block 314, method 300 may include terminating activation at Block 316. SWP activating component 124 may terminate the SWP activation procedure 130 in this case. If frame detecting component 126 detects that an ACT_SYNC frame is received at Block 314 (e.g., or that another frame is received), method 300 includes, at Block 318, initiating a different SWP activation procedure with a UICC. Different SWP activation procedure component 128 can initiate the different SWP activation procedure 132. In one example, different SWP activation procedure component 128 may select a different SWP activation procedure 132 based on one or more parameters of the frame detected by frame detecting component 126 (e.g., a type of the frame, which may be used to determine a type of the different SWP activation procedure 132 to perform, as described above).

The different SWP activation procedure 132 may be similar to the activation procedure initiated at Block 302. In one example, the different SWP activation procedure 132 may include steps 3 through 9 as shown above, but at step 10 may expect an ACT_SYNC frame instead of an ACT_READY frame. In the specific example above, different SWP activation procedure component 128 may determine to activate the different SWP activation procedure 132 as the activation procedure defined in ETSI 102613 based on detecting that the ACT_SYNC is being received (e.g., because the ACT_SYNC is expected in response to the ACT_POWER_MODE with FR=1 in the activation procedure defined by ETSI 102613). Thus, for example, method 300 includes again, at Block 320, transmitting an ACT_POWER_MODE frame with FR=0, at Block 322, detecting no response received, and at block 324, transmitting an ACT_POWER_MODE frame with FR=1, which can be performed by the SWP activating component 124, as described above. Method 300 then includes, at Block 326, determining whether an ACT_SYNC frame is received. Frame detecting component 126 can determine whether the ACT_SYNC frame is received, as described previously, which is the expected frame in this different SWP activation procedure 132. If the ACT_SYNC frame is received, then method 300 includes, at Block 312, activating SWP, as described previously. If the ACT_SYNC frame is not received, then method 300 includes, at Block 316, terminating activation, as described previously.

Figure 4:
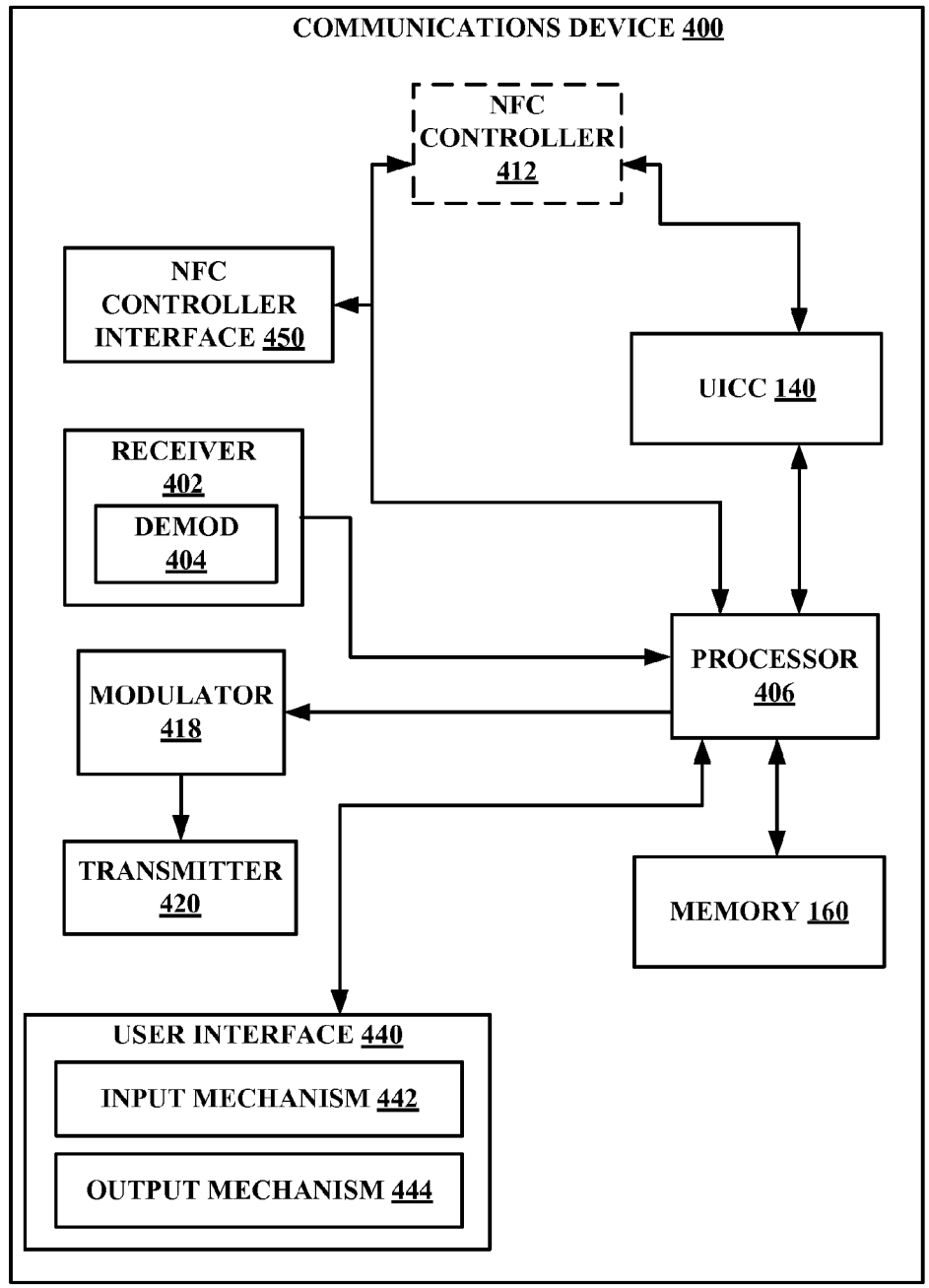
FIG. 4 is a functional block diagram of an example architecture of a communications device, according to an aspect.

While referencing FIG. 1, but turning also now to FIG. 4, an example architecture of communications device 400 is illustrated. For example, communications device 400 can be or can otherwise include communications device 102 with additional components described herein in one specific example. As depicted in FIG. 4, communications device 400 comprises receiver 402 that receives a signal from, for instance, a receive antenna (not shown), performs typical actions on (e.g., filters, amplifies, downconverts, etc.) the received signal, and digitizes the conditioned signal to obtain samples. Receiver 402 can comprise a demodulator 404 that can demodulate received symbols and provide them to processor 406 for channel estimation. Processor 406 can be a processor dedicated to analyzing information received by receiver 402 and/or generating information for transmission by transmitter 420, a processor that controls one or more components of communications device 400, and/or a processor that both analyzes information received by receiver 402, generates information for transmission by transmitter 420, and controls one or more components of communications device 400, including executing CLF 112, SWP interface 120, and/or SWP activating component 124 as described herein. For example, processor 406 may include one or more processor modules or components configured to implement SWP interface 120, SWP activating component 124, frame detecting component 126, and different SWP activation procedure component 128, as described above. Further, signals may be prepared for transmission by transmitter 420 through modulator 418 which may modulate the signals processed by processor 406.

Communications device 400 can additionally comprise memory 160 that is operatively coupled to various components, such as but not limited to processor 406 and that can store data to be transmitted, received data, information related to available channels, TCP flows, data associated with analyzed signal and/or interference strength, information related to an assigned channel, power, rate, or the like, and any other suitable information for assisting in NFC connection establishment. For example, memory 160 may also include stored computer-executable code or instructions, executable by processor 406, for activating SWP and/or otherwise establishing and/or managing an SWIO interface between an NFC controller 412 and UICC 140, e.g., code for executing SWP interface 120, SWP activating component 124, frame detecting component 126, and different SWP activation procedure component 128, as described above. NFC controller 412, for example, may be or may include a CLF 112, as described herein.

Further, processor 406 and/or NFC controller 412 can provide means for initiating a SWP activation procedure, means for detecting an unexpected frame received during the SWP activation procedure, and means for initiating a different SWP activation procedure based on the unexpected frame, as described herein. Similarly, processor 406 and/or NFC controller 412 may provide means for performing substantially any functions described herein with respect to components of FIG. 1, blocks of FIGS. 2 and 3, etc.

It will be appreciated that data store (e.g., memory 160) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 160 of the subject systems and methods may comprise, without being limited to, these and any other suitable types of memory.

In another aspect, communications device 400 may include NFC controller interface (NCI) 450. In an aspect, NCI 450 may be configured to enable communications between a NFC enabled antenna (e.g., 402, 420) and NFC controller 412. It is to be appreciated that NCI 450 may be configured to function in a listening mode and/or a polling mode.

Additionally, communications device 400 may include user interface 440. User interface 440 may include input mechanisms 442 for generating inputs into communications device 400, and output mechanism 444 for generating information for consumption by the user of the communications device 400. For example, input mechanisms 442 may include a mechanism such as a key or keyboard, a mouse, a touch-screen display, a microphone, etc. Further, for example, output mechanism 444 may include a display, an audio speaker, a haptic feedback mechanism, a Personal Area Network (PAN) transceiver etc. In the illustrated aspects, the output mechanism 444 may include a display configured to present media content that is in image or video format or an audio speaker to present media content that is in an audio format.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal. Moreover, in an aspect, a component may be generally understood to be one of the parts that make up a system, may be hardware or software, and/or may be divided into other components Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used by communications devices that support various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features may be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a specially programmed general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for activating a single wire protocol (SWP) interface with a circuit card, comprising:
   initiating a SWP activation procedure with a circuit card;
   detecting that an unexpected frame is received during the SWP activation procedure; and
   initiating a different SWP activation procedure with the circuit card based at least in part on receiving the unexpected frame during the SWP activation procedure.

2. The method of claim 1, wherein the different SWP activation procedure comprises receiving a frame that is similar to the unexpected frame.

3. The method of claim 1, further comprising:
   transmitting an activate power mode frame to the circuit card;
   detecting that no response or a corrupted response is received with respect to the activate power mode frame; and transmitting another activate power mode frame to the circuit card based on detecting that no response or the corrupted response is received to the activate power mode frame, wherein the unexpected frame is received in response to the another activate power mode frame.

4. The method of claim 3, wherein the unexpected frame is an activate synchronization frame.

5. The method of claim 1, wherein the different SWP activation procedure comprises:

receiving an activate synchronization frame in response to an activate power mode frame transmitted to the circuit card; and activating SWP with the circuit card based at least in part on receiving the activate synchronization frame.

6. The method of claim 1, further comprising selecting the different SWP activation procedure based at least in part on a type of the unexpected frame.

7. An apparatus for activating a single wire protocol (SWP) interface with a circuit card, comprising:

a memory; and at least one processor coupled with the memory and configured to:

initiate a SWP activation procedure with a circuit card;

detect that an unexpected frame is received during the SWP activation procedure; and initiate a different SWP activation procedure with the circuit card based at least in part on receiving the unexpected frame during the SWP activation procedure.

8. The apparatus of claim 7, wherein the different SWP activation procedure comprises receiving a frame that is similar to the unexpected frame.

9. The apparatus of claim 7, wherein the at least one processor is further configured to:

transmit an activate power mode frame to the circuit card;

detect that no response or a corrupted response is received to the activate power mode frame; and transmit another activate power mode frame to the circuit card based on detecting that no response or the corrupted response is received to the activate power mode frame, and wherein the unexpected frame is received in response to the another activate power mode frame.

10. The apparatus of claim 9, wherein the unexpected frame is an activate synchronization frame.

11. The apparatus of claim 7, wherein the different SWP activation procedure comprises:

receiving an activate synchronization frame in response to an activate power mode frame transmitted to the circuit card; and activating SWP with the circuit card based at least in part on receiving the activate synchronization frame.

12. The apparatus of claim 7, wherein the at least one processor is further configured to select the different SWP activation procedure based at least in part on a type of the unexpected frame.

13. An apparatus for activating a single wire protocol (SWP) interface with a circuit card, comprising:

means for initiating a SWP activation procedure with a circuit card;

means for detecting that an unexpected frame is received during the SWP activation procedure; and means for initiating a different SWP activation procedure with the circuit card based at least in part on receiving the unexpected frame during the SWP activation procedure.

14. The apparatus of claim 13, wherein the different SWP activation procedure comprises receiving a frame that is similar to the unexpected frame.

15. The apparatus of claim 13, wherein the means for initiating the SWP activation procedure is further configured to:

transmit an activate power mode frame to the circuit card;

detect that no response or a corrupted response is received to the activate power mode frame; and transmit another activate power mode frame to the circuit card based on detecting that no response or the corrupted response is received to the activate power mode frame, and wherein the unexpected frame is received in response to the another activate power mode frame.

16. The apparatus of claim 15, wherein the unexpected frame is an activate synchronization frame.

17. The apparatus of claim 13, wherein the different SWP activation procedure comprises:

receiving an activate synchronization frame in response to an activate power mode frame transmitted to the circuit card; and activating SWP with the circuit card based at least in part on receiving the activate synchronization frame.

18. The apparatus of claim 13, wherein the means for initiating the different SWP activation procedure is further configured to select the different SWP activation procedure based at least in part on a type of the unexpected frame.

19. A non-transitory computer-readable medium storing computer executable code for activating a single wire protocol (SWP) interface with a circuit card, comprising:

code for initiating a SWP activation procedure with a circuit card;

code for detecting that an unexpected frame is received during the SWP activation procedure; and code for initiating a different SWP activation procedure with the circuit card based at least in part on receiving the unexpected frame during the SWP activation procedure.

20. The non-transitory computer-readable medium of claim 19, wherein the different SWP activation procedure comprises receiving a frame that is similar to the unexpected frame.

21. The non-transitory computer-readable medium of claim 19, wherein the code for initiating the SWP activation procedure comprises:

code for transmitting an activate power mode frame to the circuit card;

code for detecting that no response or a corrupted response is received to the activate power mode frame; and code for transmitting another activate power mode frame to the circuit card based on detecting that no response or the corrupted response is received to the activate power mode frame, and wherein the unexpected frame is received in response to the another activate power mode frame.

22. The non-transitory computer-readable medium of claim 21, wherein the unexpected frame is an activate synchronization frame.

23. The non-transitory computer-readable medium of claim 19, wherein the code for initiating the different SWP activation procedure comprises:

code for receiving an activate synchronization frame in response to an activate power mode frame transmitted to the circuit card; and code for activating SWP with the circuit card based at least in part on receiving the activate synchronization frame.

24. The non-transitory computer-readable medium of claim 19, wherein the code for initiating the different SWP activation procedure comprises code for selecting the different SWP activation procedure based at least in part on a type of the unexpected frame.

* * * * *